United States Patent [19]
Foss et al.

[11] Patent Number: 6,119,231
[45] Date of Patent: Sep. 12, 2000

[54] DATA SCANNING NETWORK SECURITY TECHNIQUE

[75] Inventors: Andrew L. Foss, San Jose; Ricky K. Lowe, Menlo Park; Johnson Wu, Sunnyvale, all of Calif.

[73] Assignee: Cisco Technologies, Inc., San Jose, Calif.

[21] Appl. No.: 08/962,045

[22] Filed: Oct. 31, 1997

[51] Int. Cl.⁷ .................................................. G06F 12/14
[52] U.S. Cl. .......................................................... 713/200
[58] Field of Search .................................. 713/200, 201, 713/202; 380/3, 4, 25; 709/206, 229; 714/26, 39

[56] References Cited

U.S. PATENT DOCUMENTS

| | | | |
|---|---|---|---|
| 5,684,954 | 11/1997 | Kaiserswerth et al. | 395/200.2 |
| 5,790,790 | 8/1998 | Smith et al. | 709/206 |
| 5,850,386 | 12/1998 | Anderson et al. | 370/241 |

*Primary Examiner*—Robert W. Beausoliel, Jr.
*Assistant Examiner*—Pierre E. Elisia
*Attorney, Agent, or Firm*—Beyer & Weaver, LLP

[57] ABSTRACT

A system and method are disclosed for providing enhanced computer network security by scanning data, specifically electronic mail messages, sent to the network before the data is received and transmitted by the network's mail server. An e-mail message is received by a computer network configured to receive data and is checked as the data is received and before it is transmitted to a node on the computer network. The method includes determining whether an external source is attempting to establish a mail connection with the computer network configured to include a data scanning device that recognizes one or more data transfer protocols. Once the data is received the data scanning device begins evaluating the data by first determining whether the data is formatted according to one of the recognized protocols. The data scanning device begins scanning the data for acceptable content and format according to a rule set established by one of the recognized protocols. This is done at the same time as the data is received by the data scanning device. It is then determined whether the data should be sent to its destination on the computer network. If necessary, the data is translated before being passed to its destination on the computer network.

46 Claims, 6 Drawing Sheets

DATA SCANNING NETWORK SECURITY TECHNIQUE

BACKGROUND OF THE INVENTION

1. Background

The present invention relates to network security systems for securing electronic data transfer connections to a private computer network. The security system of the present invention ensures that harmful or unwanted electronic mail ("e-mail") messages do not enter a network by selectively checking portions of the e-mail.

2. Prior Art

Private computer networks, such as Intranets and enterprise networks, are commonly serviced by one or more server computers that normally provide a particular network function. Some of the more common server computers are file servers and database servers which are responsible for specific functions. A server can have a dedicated function such as receiving and distributing electronic mail messages or e-mail on a network. This type of server, known as a mail server, typically regulates and distributes incoming mail messages to nodes (i.e. users) on the network. It can also controls outgoing mail traffic. The mail server has become an increasingly common entity on many computer networks. This is true because of exponential growth in the use of e-mail both within an enterprise or private network and on the Internet. Individuals, whether at work or at home, are turning more often to electronic mail for communicating with other individuals and entities. As a result, the volume of e-mail traffic on computer networks of all scales and types has increased rapidly over the past several years and with it the security risks to computer networks.

As the name implies, a private network is not always freely accessible to external networks or entities. One way for an external source to gain access to nodes on a private network (a node being an arbitrary entity such as an end user, a printer, or a server), is to go through a server on the network. Gaining access to a network through one of the network's servers depends on the network configuration. A network may be configured such that all e-mail among nodes in the network and e-mail going in and out of the network must be serviced by a mail server alone or by a combination of a mail server and a mail relay.

FIG. 1 is a diagram showing a prior art configuration of a mail server 100 and a mail relay 102 regulating incoming e-mail message 104 to a network 106 from an external source.

Mail relay 102 acts as a gatekeeper for the mail server 100. As such, it is in a particularly vulnerable position because it must be publicly accessible in that external sources wanting to send mail to a node 108 on the private network 106 must be able to access it. Any incoming mail messages first go through the mail relay 102 and are then distributed to nodes on the network by mail server 100. Mail relay 102 has the ability to store or buffer incoming e-mail message 104 and will do so if for some reason the mail server 100 is unable to process mail at a given time (e.g. when the mail server is down or when there is a backlog of mail because of high volume). Thus, mail relay 102 can, at any given time, have stored in its own memory or buffer 110 live (i.e., unread) e-mail messages which have not been distributed to nodes on the network.

This situation, among others, makes the mail relay/mail server configuration particularly vulnerable to attack from external sources. Stated another way, there are no significant barriers from keeping an external source from corrupting e-mail messages stored in mail relay 102 or from transmitting bad messages to its memory 110 which will, at a later time, be relayed to the mail server 100 and, presumably, be distributed on network 106. An intruder may be able to read buffered mail or corrupt the mail stored in the mail relay in some way without letting mail server 100 find out about it. This is just one way of infiltrating a network by gaining access to the network's mail server.

A network's mail server is particularly vulnerable to infiltration given the increasing volume of e-mail traffic within and among private networks. In order to attack a mail server, the intruder must first gain access to the server. As described above, this can be done by manipulating the mail relay. In addition, an intruder can obtain information about the server and send a certain type of e-mail message to it that will cause the server to perform certain functions. Information about a network's mail server can be derived from examining data exchanged through the use of mail transfer protocols or, more broadly, data transfer protocols that use a network mail server. An intruder can examine data in the envelope and headers commonly used in mail transfer protocols to derive Internet Protocol (IP) addresses (i.e., host addresses), and port numbers of the network's entities or can examine other types of messages utilized by certain protocols to learn similar and related information. Once the intruder gains access to the mail server, network security may be jeopardized.

In view of the above, it would be desirable to determine the nature and type of e-mail messages being sent to nodes in a private network before the messages are accepted by the network's mail server for distribution on the network. Through this procedure, the network could reject or translate/sanitize in real time those e-mail messages that may harm the network or are simply undesirable, thereby providing an enhanced and efficient security mechanism for the network.

SUMMARY OF THE INVENTION

To achieve the foregoing and other objects and in accordance with the purpose of the present invention, methods and apparatuses are described herein for securing electronic mail messages being sent to nodes in a private computer network from external sources. An e-mail message is received by a computer network configured to receive data and is checked as the data is received and before it is transmitted to a node on the computer network. In one preferred embodiment, the method includes determining whether an external source is attempting to establish a mail connection with the computer network that is configured to include a mail guard device that recognizes one or more protocols. Once the data is received the mail guard device begins evaluating the data by first determining whether the data is formatted according to one of the recognized protocols.

In a preferred embodiment, the mail guard device begins scanning the data for acceptable content and format according to a rule set established by one of the recognized protocols. The data is scanned in subdivisions set by the recognized protocol. This is done at the same time as the data is received by the mail guard device. It is then determined whether the data should be sent to its destination on the computer network. If necessary, the data is translated before being passed to its destination on the computer network.

In another preferred embodiment, the data is passed to its destination if the data is found to contain acceptable content and formatting. If the data is not formatted according to a recognized protocol or has unacceptable content, the data is rejected. Acceptable content and formatting is determined by a rule set established by the protocol.

In another preferred embodiment, one of the recognized protocols is the Simple Mail Transfer Protocol that includes the following commands: HELO, MAIL, RCPT, NOOP, QUIT, DATA, and RSET.

BRIEF DESCRIPTION OF THE DRAWINGS

The invention, together with further objects and advantages thereof, may best be understood by reference of the following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Figure 1:
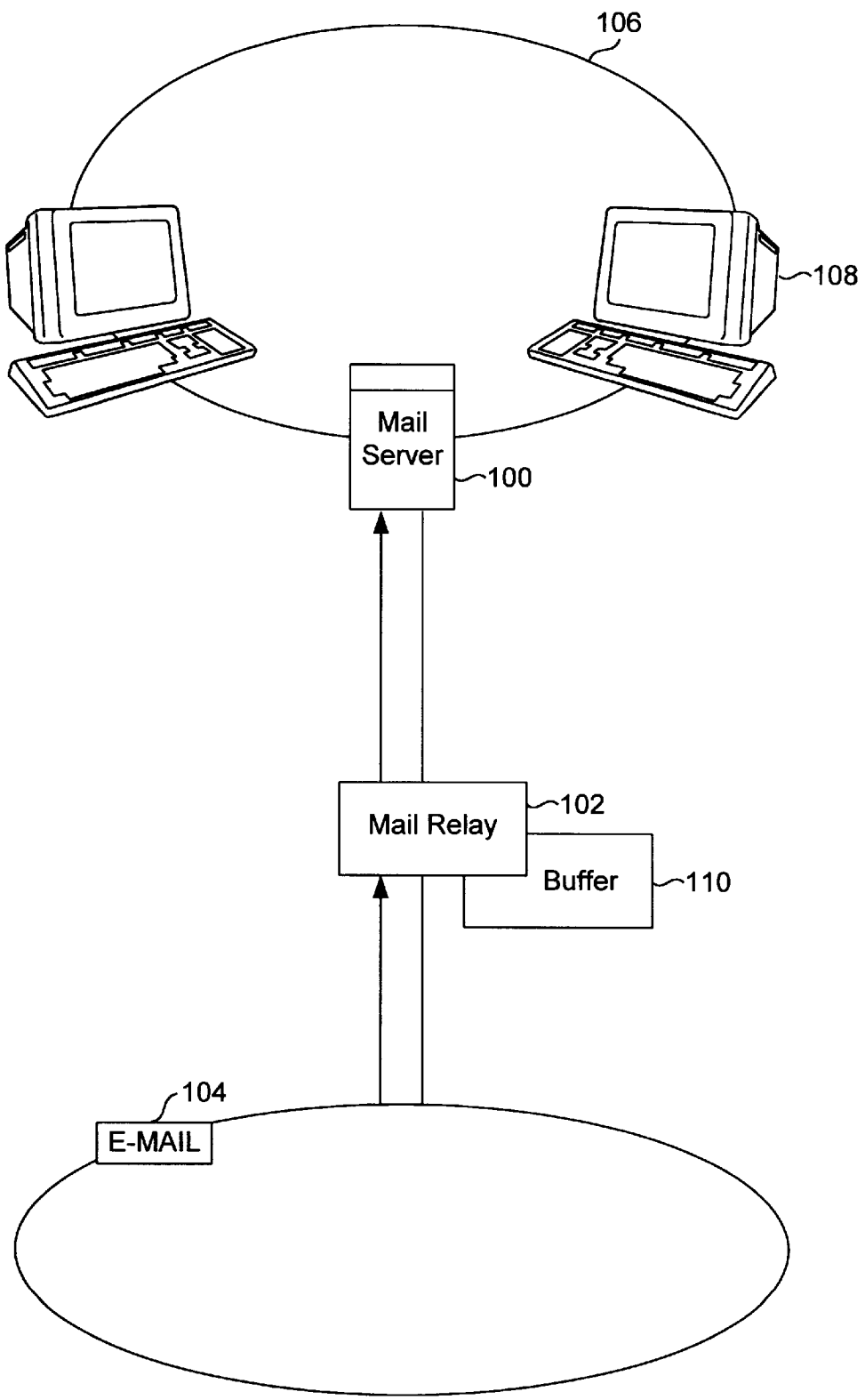
FIG. 1 is a diagram showing a prior art configuration of a mail server and a mail relay regulating incoming e-mail to a private network from an external source.
Figure 2:
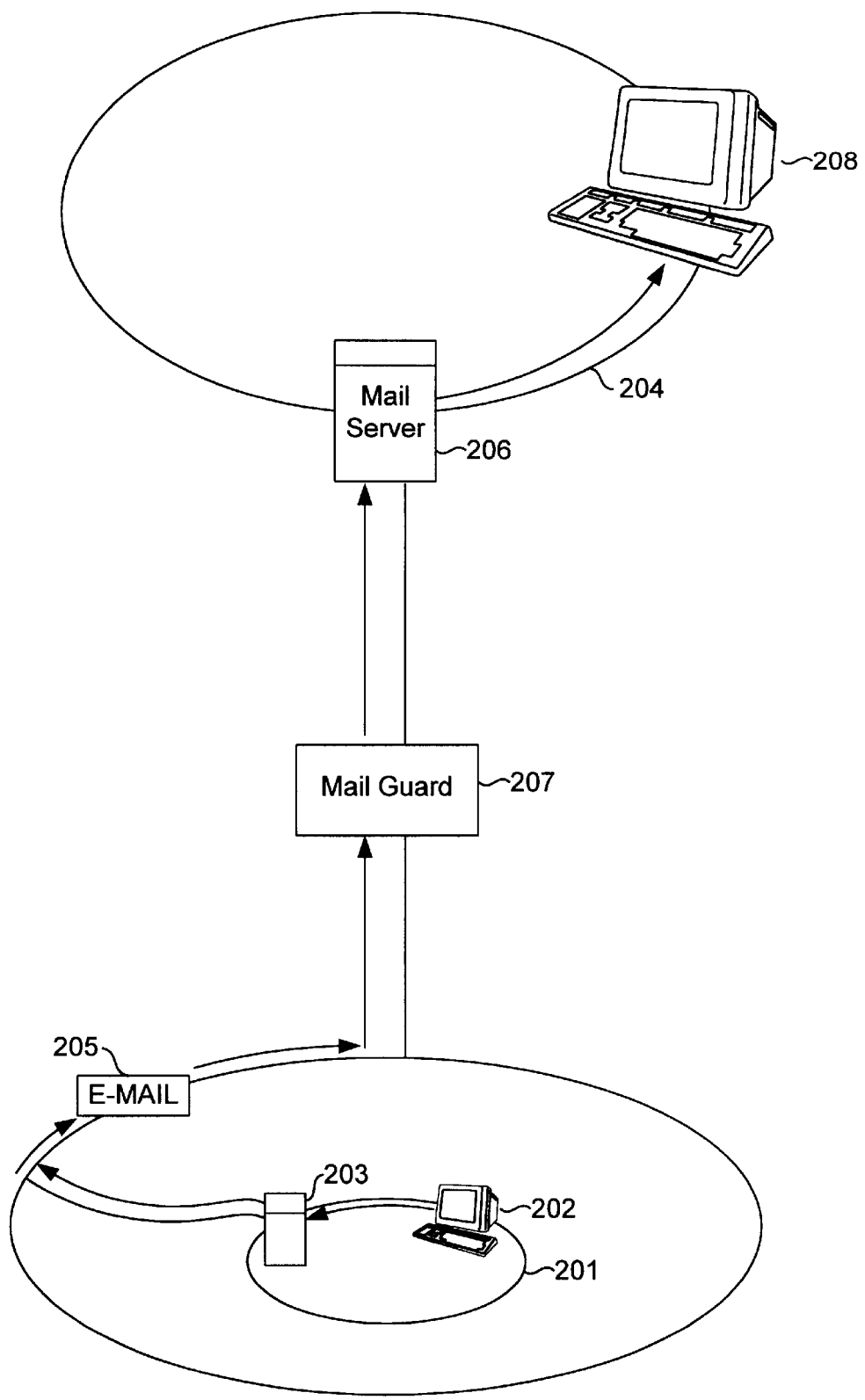
FIG. 2 is a diagram illustrating the described embodiment of a computer-based system that implements the data scanning network security technique of the present invention.

FIG. 2 is a diagram illustrating a preferred embodiment of the computer-based system that implements the data scanning network security technique of the present invention. Shown is a private network 201, for example an enterprise network, which can have numerous nodes (i.e., arbitrary entities). Network 201 has shown terminal 202 and mail server 203. Private networks can range in size from two nodes to tens of thousands of nodes and can be made up of several smaller network segments. Nodes on the network are capable of sending and receiving e-mail messages from other nodes on the same network or from external sources. In many instances, one node on the network is the mail server 203 which is responsible for in-coming and internal mail functions on the network.

Nodes on private network 204 can receive e-mail from sources outside the network. Typically, an e-mail message 205 is comprised of an envelope, header, and data. The envelope normally contains the Internet Protocol (IP) address of where the e-mail came from (source) and where the e-mail is to be delivered (destination). Mail server 206 uses this information to direct message 205 within its private network 204 or, if necessary, send it back to the source 202. Mail server 206 receives incoming e-mail messages only after the messages have passed through mail guard device 207 which, although not a node, is a component of network 204. Mail guard device 207 scans all electronic mail messages sent to network 204 from external sources. The external source in FIG. 2 is user terminal node 202 on private network 201 with access to the Internet (the worldwide publicly accessible computer network). Other possible sources are individual users connected directly to the Internet, including those going through Internet service providers. In any case, e-mail message 205 with a correct port number and host address makes its way to node 208 on network 204 by first going through mail guard device 207 before it enters mail server 206 which then directs it to its destination.

Figure 3:
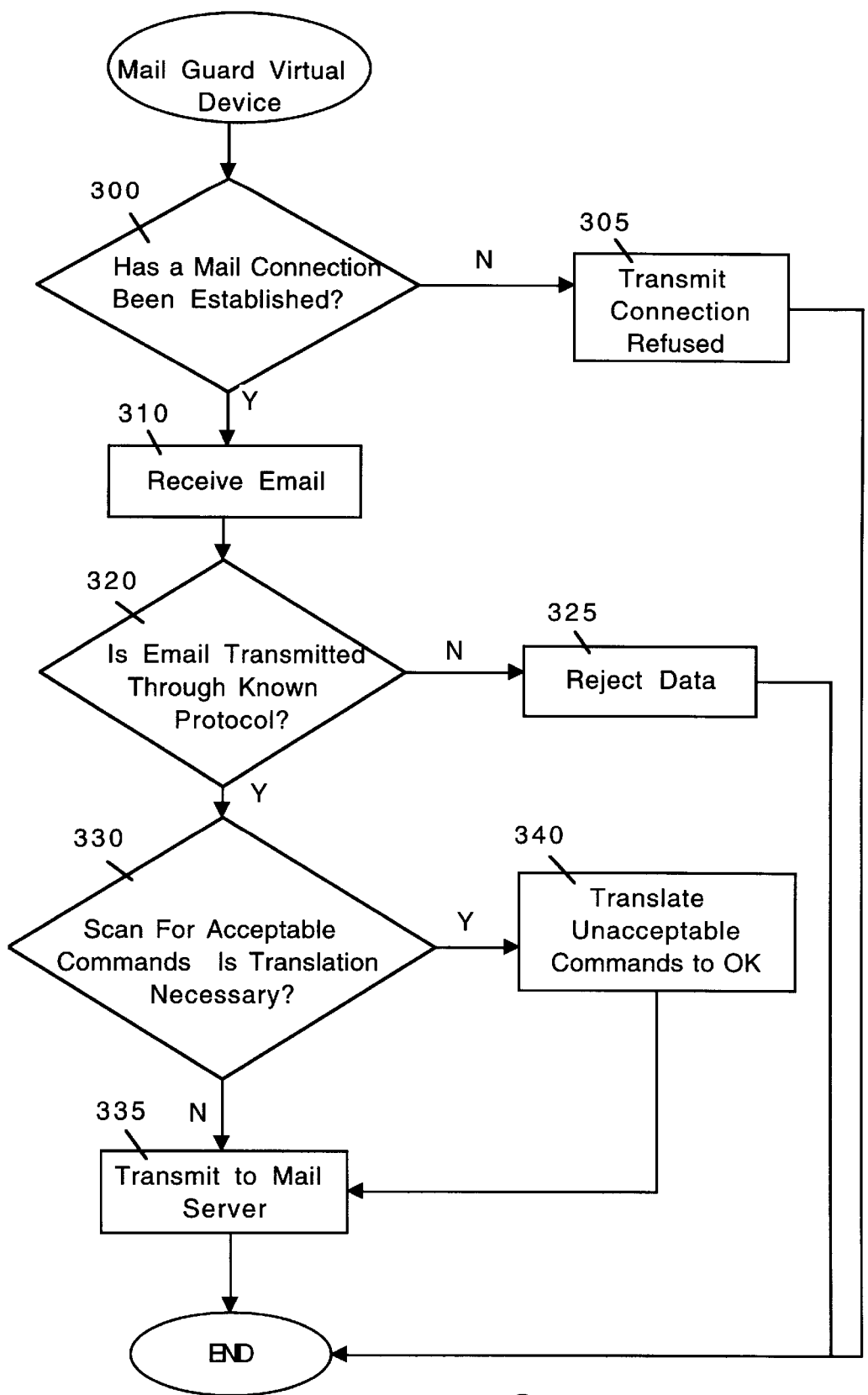
FIG. 3 is a flowchart of the steps taken in the described embodiment of the mail guard virtual device which provides enhanced security for a private network mail server.

FIG. 3 is a flowchart of the steps taken in a preferred embodiment of the mail guard virtual device of the present invention providing enhanced security for a private network mail server. Beginning with step 300, the system determines whether a mail connection has been established by an external source. If an external source is attempting to send an e-mail message to nodes in the network, a mail connection is established. If a mail connection is not established, the device will not receive the data. A "connection refused" message and the data are transmitted to the sender in step 305 and the process ends, and there is a TCP reset. If a mail connection is established, the system receives the e-mail message in step 310. Once the e-mail has been received, the device is in position to begin evaluating the e-mail in step 320.

The device first checks whether the e-mail message is being sent through a known protocol in step 320. The particular mail server protected by the mail guard device will recognize data messages sent only through particular protocols. Examples of data and mail transfer protocols include SMTP, H.323, ICMP, and FTP. If the data, for example an e-mail message, is sent through a protocol known to the mail server, the mail guard device is able to begin scanning for commands and data making up the e-mail message as shown in step 330. If the system does not recognize the protocol, the e-mail is rejected in step 325. The e-mail is never sent to the mail server, and the mail guard device waits for the next e-mail. In step 330, the system begins scanning the e-mail message. The scan is done using a search algorithm that can detect acceptable data. What is acceptable and unacceptable is determined by a rule set established by the protocol and is also configurable based on other network parameters. Steps 320 through 340 are shown in greater detail in FIGS. 4A and 4B.

As mentioned above, the system begins scanning for commands in step 330. If the command is acceptable, it is transmitted directly to the mail server as shown in step 335. If the data contains a command that is unacceptable, it is translated to an acceptable command as determined by the rule set. This is done in step 340. For example, if an e-mail message formatted according to SMTP contained a DEBUG command, the rule set established by SMTP prohibits this command from being sent to the mail server and is translated to a NOOP command (an acceptable SMTP command). Once it is translated in step 340, the data is transmitted to the mail server in step 335.

It should be noted that in a preferred embodiment all the steps described—steps 320 through 340 in particular—are performed in real time. They are done as the e-mail is received by the mail guard device. The data is not stored, buffered, or deconstructed during the process. The e-mail is scanned in step 330 as soon as it is received and the translation in step 340 is done as the e-mail is being scanned.

Thus, in a preferred embodiment, if the scanner detects a DEBUG command in a header of an SMTP e-mail, it will replace the DEBUG with a NOOP command, replace all the parameters associated with the DEBUG command with blanks or filler, and continue scanning the data. None of the data is stored or buffered during the translation process and—using the SMTP example—the scanning simply continues after the DEBUG parameters have been replaced with filler.

Figure 4A:
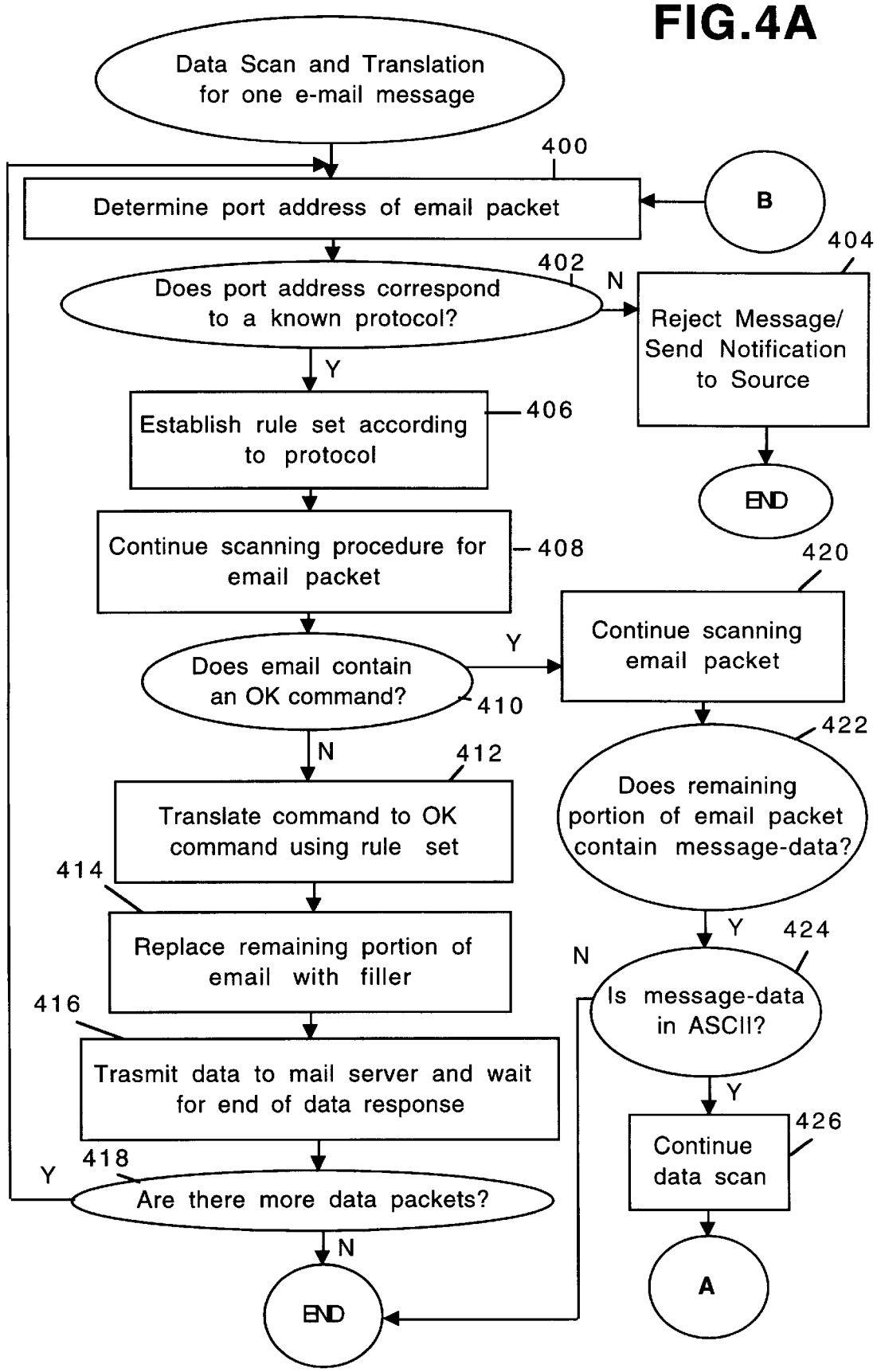
FIGS. 4A and 4B show steps 320 through 340 of FIG. 3 describing the data scanning and transmitting steps in greater detail.
Figure 4B:
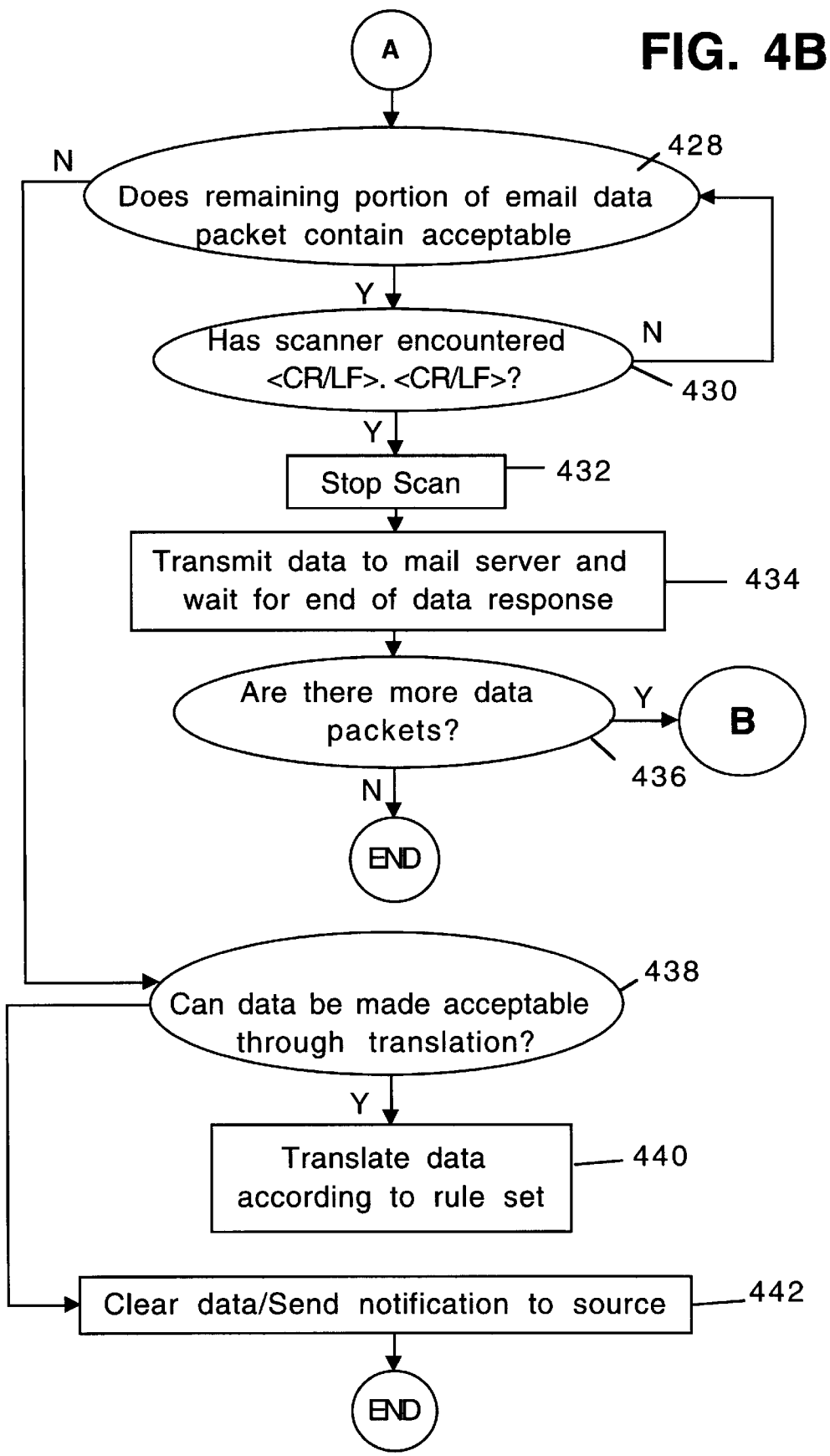

FIGS. 4A and 4B show steps 320 through 340 describing a preferred embodiment of the data scanning and transmitting stages in greater detail. In step 400 of FIG. 4A, the system determines the port address of the e-mail packet. It will detect the port address once it begins scanning the e-mail data packet. By determining the port address, the system will know whether the e-mail packet is formatted in a known protocol. All e-mail messages must be formatted according to a certain mail or data transfer protocol. Because the port address is contained in the beginning of the packet, the protocol can be determined by the scanner soon after it starts scanning the packet. For example, if it detects a port address of 25, the Simple Mail Transfer Protocol (SMTP) port in the TCP/IP protocol, it will expect the message to be an e-mail message formatted according to SMTP. In another example, if it detects a port address of 21 it will expect the data to be transferred under another protocol referred to as the File Transfer Protocol (FTP).

Once the system determines the port address, it establishes whether the corresponding protocol is one known or recognized by the mail guard device in step 402. If the protocol is not recognized by the device, the system will send a rejection message or similar notification to the source in step 404 and the process ends. In a preferred embodiment, the system will know where to send the rejection message by reading the source address typically contained in the e-mail envelope.

Following the normal flow of operations, if the e-mail corresponds to a nown protocol, the system will invoke a rule set containing rules based on the protocol in step 406. One of the primary functions of the rule set is to inform the system during the scanning which characters, symbols (and certain sequences thereof), and commands, are not allowed in an e-mail. It is possible that although the e-mail message contains a valid port address, such as port 25 for SMTP, the content that follows does not conform to the expected SMTP protocol. Once the scanner detects that the format of the content that follows does not conform, the message is translated to a NOOP command (a "no operation" command in SMTP) and handled by the system as an SMTP message containing the NOOP command. The NOOP command is a fall-back command in SMTP which prevents the e-mail from reaching the mail server. This operation is discussed in greater detail below.

In step 408 the system continues scanning the e-mail data packet after having established a rule set. In a preferred embodiment, the scanning function is implemented, in part, by using a searching algorithm. The portions of data processed by the search algorithm are determined according to the protocol. The algorithm may begin processing the data byte by byte and may increase to word by word and to long-word by long-word. The algorithm is typically more efficient if the compare function component in the algorithm can load and compare comparatively large portions of data at a time. Thus, depending on how the data is parsable, the scanning operation may become more efficient as more data is read or once a particular command or string is detected. The ability to increase the length of data searched and compared depends on the protocol used in transferring the data.

In step 410, the system determines whether the e-mail contains an acceptable or OK command. If the e-mail contains an OK command the system continues with steps following 420 where the e-mail message-data (i.e. the actual message portion of the e-mail) is checked. If the e-mail does not contain an OK command, the system continues with step 412.

In step 412, the system translates the unacceptable command to an OK command using the protocol rule set. Different protocols have different rule sets. As mentioned above, the mail guard device can recognize certain protocols. It has rule sets for the protocols it recognizes. For example, if the e-mail message is sent using SMTP, the device establishes the SMTP rule set which states, among other things, that the acceptable commands are HELO, MAIL, RCPT, DATA, RSET, NOOP, and QUIT. The rule set may also contain certain harmful characters which, if encountered, are dropped or translated. Once the rule set has been established in step 406, the scanner knows what to look for.

With some protocols, including SMTP, where the data is in ASCII, the search is done byte by byte and does not increase at any point in the processing. For example, with SMTP the search algorithm will search for any of the 128 ASCII characters. If it detects an upper or lower case H, M, R, D, R, N, or Q,—the first letters of the seven acceptable SMTP commands—it will continue scanning. Thus, the scan is done by examining the data one byte at a time. For example, if it detects a "d", it will continue scanning. If the next byte is any ASCII character other than an "a" (as expected for the DATA command), the scanning will stop and the command will be translated to a NOOP. This function is performed in step 412. If the next byte is an "a", followed by a "t" and another "a", the scanner knows what is being read is a DATA command and will scan the data that follows accordingly.

Another example using SMTP is the MAIL command. Once the scanner determines that the data scanned is a MAIL command using the same process just described with regard to the DATA command, the scanner will continue scanning for fields it would expect to see after MAIL. Rules of this sort are also contained in the rule set. The first field is the "FROM" field whose data is contained within angled brackets (<and >) and will then look for other fields it would expect to see such as "TO." If the scanner does not find a required field or finds an unacceptable field, it will go to the beginning of the data stream and translate the lead command, in this example the MAIL command, to NOOP and insert blanks or filler after the command and continue. This is done in step 414. The scanner will also search for certain characters or symbols, such as "!" "|" "< >" and ";" in SMTP, that must be located at particular points in the data for the commands to be processed correctly. Correct usage of these characters are also contained in the rule set. These symbols may indicate the beginning or end of data or have a special role in command syntax. In some cases, if the symbols are out of place or used incorrectly, they can be used to make the mail server perform unauthorized functions. If they are detected and are not in an acceptable sequence, the initial command is translated to a NOOP.

In step 416 the filler data is transmitted to the mail server. At this stage the command and data being sent to the server is harmless to the server and the network. The server will then send an end-of-data response back to the device telling the device that it can now send the next data packet. Each protocol has its own end-of-data response. In SMTP it is the string "250". The system will continue passing data until it receives an end-of-data indicator. In step 418, the system checks if there are more data packets and, if so, returns to step 400 to determine the port address of the packet.

In step 420 the system continues scanning the e-mail packet. It will do this after determining in step 410 that the e-mail contains an OK command. In step 422 the system determines whether the remaining portion of the e-mail packet contains message-data. Message-data is typically the text portion of the e-mail packet, that is, the actual message being sent from the sender to the receiver. For example, in SMTP, message-data would follow the DATA command. The message-data can be in one of various formats. In a preferred embodiment, the system determines whether the message-data is in ASCII format in step 424. If the message-data is not in ASCII format, the system will discontinue scanning and end the operation. If the message-data is in ASCII format, the system will continue the data scan as shown in step 426.

In step 428 of FIG. 4B, the system checks whether the remaining portion of the e-mail contains acceptable data. If the system determines that the data does not contain acceptable characters or symbols, control transfers to step 438 where the system determines whether the data can be made acceptable through translation. If the data is acceptable, the system will continue scanning until it detects a carriage return/line feed (CR/LF) followed by a period (.), followed by another CR/LF. In a preferred embodiment, this sequence of characters and control characters, essentially a period on a line by itself, is an indication that the message-data has ended. In step 432 the system stops scanning and transmits the data to the mail server in step 434. The system will also wait for an end-of-data response from the mail server in step 434. In a preferred embodiment, the end-of-data response is the character string "250". In step 436, the system will check to see whether there are more data packets and, if so, transfers control to step 400. If there are no more data packets, the process ends and the system waits for the next e-mail connection.

Returning to step 428, the system determines whether the e-mail contains acceptable or unacceptable data. If it contains unacceptable data, control transfers to step 438 where the system determines whether the data can be made acceptable through translation. This step is similar to step 412 where the system translates an unacceptable command to an OK command using the protocol rule set. In this aspect of the translation, the system will use other facets of the rule set such as illegal or unacceptable characters or symbols such as an "!" or a ";" which should only be located at particular locations in the data. If the data can be translated according to the rule set, the system does so in step 440 at which point the system will stop scanning as indicated in step 432. The data is then transmitted to the mail server as shown in step 434 and the system waits for an end-of-data response. If the data cannot be made acceptable through translation, control goes to step 442 where the system clears the data and sends a notification to the sender informing it that the e-mail was not deliverable.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, comparing, or detecting. In any of the operations described herein that form part of the present invention, these operations are machine operations. Useful machines for performing the operations of the present invention include general purpose digital computers or other similar devices. In all cases, it should be borne in mind the distinction between the method of operations in operating a computer and the method of computation itself. The present invention relates to method steps for operating a computer in processing electrical or other physical signals to generate other desired physical signals.

The present invention also relates to a computer system for performing these operations. This computer system may be specially constructed for the required purposes, or it may be a general purpose computer selectively activated or reconfigured by a computer program stored in the computer. The processes presented herein are not inherently related to any particular computer or other computing apparatus. In particular, various general purpose computing machines may be used with programs written in accordance with the teachings herein, or it may be more convenient to construct a more specialized computer apparatus to perform the required method steps.

Figure 5:
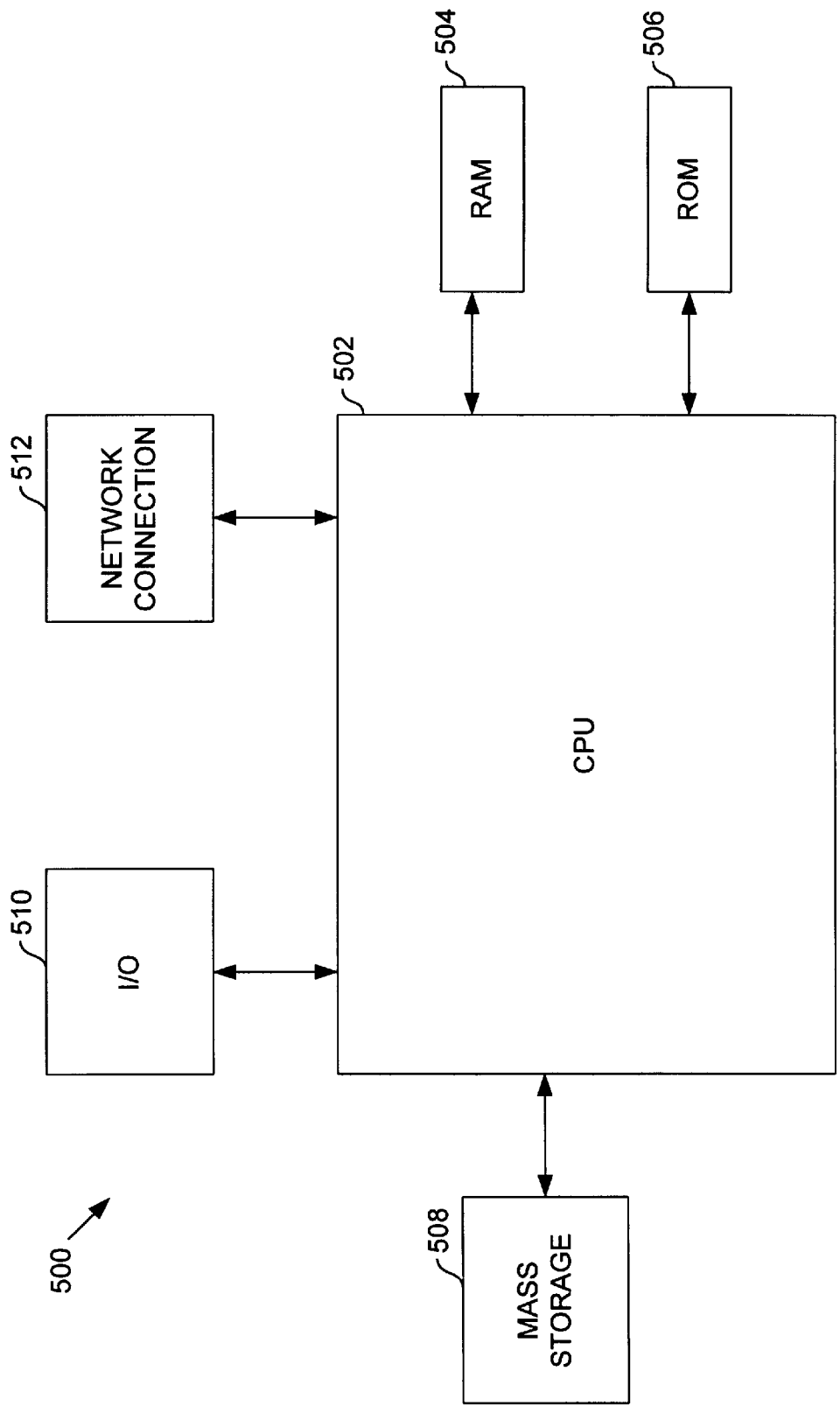
FIG. 5 is a schematic illustration of a general purpose computer system suitable for implementing the present invention.

FIG. 5 is a schematic illustration of a general purpose computer system suitable for implementing the present invention. The computer system includes a central processing unit (CPU) 502, which CPU is coupled bidirectionally with random access memory (RAM) 504 and unidirectionally with read only memory (ROM) 506. Typically RAM 504 includes programming instructions and data, including text objects as described herein in addition to other data and instructions for processes currently operating on CPU 502. ROM 506 typically includes basic operating instructions, data and objects used by the computer to perform its functions. In addition, a mass storage device 808, such as a hard disk, CD ROM, magneto-optical (floptical) drive, tape drive or the like, is coupled bidirectionally with CPU 502. Mass storage device 508 generally includes additional programming instructions, data and text objects that typically are not in active use by the CPU, although the address space may be accessed by the CPU, e.g., for virtual memory or the like. Each of the above described computers further includes an input/output source 510 that typically includes input media such as a keyboard, pointer devices (e.g., a mouse or stylus) and the like. Each computer can also include a network connection 512 over which data, including, e.g., text objects, and instructions can be transferred. Additional mass storage devices (not shown) may also be connected to CPU 502 through network connection 512. It will be appreciated by those skilled in the art that the above described hardware and software elements are of standard design and construction.

Although the foregoing invention has been described in some detail for purposes of clarity of understanding, it will be apparent that certain changes and modifications may be practiced within the scope of the appended claims. For example, although the SMTP protocol has been used predominantly to describe the invention the mail guard virtual device is equally well-suited for other protocols such as FTP, ESMTP, and HTTP. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. In a computer network configured to receive data, a method of checking data as the data is received and before the data is transmitted to a node on the computer network, the method including the steps of:
   determining whether an external source is attempting to establish a mail connection with a computer network wherein the computer network is receptive to one or more recognized protocols;
   receiving the data from the external source;
   determining whether the data from the external source is formatted according to one of the recognized protocols;
   scanning the data for acceptable content and format as determined by a rule set established by one of the recognized protocols such that the data is scanned in subdivisions set by a recognized protocol as the data is received by the computer network;
   determining whether the data is passed to a node on the computer network;
   translating the data before transmitting it to the node on the computer network; and
   transmitting the data to the node on the computer network soon after the data is scanned.

2. A method as recited in claim 1 wherein the external source is the publicly accessible world-wide computer network known as the Internet.

3. A method as recited in claim 1 wherein the recognized protocols include SMTP, ICMP, FTP, and H.323.

4. A method as recited in claim 1 wherein the step of determining whether the data from the external source is formatted according to one of the recognized protocols further includes the step of rejecting the data if the data is not formatted according to one of the recognized protocols.

5. A method as recited in claim 4 further including the step of sending a rejection message to a source if the protocol is not one of the recognized protocols.

6. A method as recited in claim 1 wherein the node on the computer network is a mail server.

7. A method as recited in claim 1 wherein the step of determining whether the data should be transmitted to a node on the computer network further includes the step of passing the data to the node if a command contained within the data is acceptable.

8. A method as recited in claim 1 wherein the step of scanning the data for acceptable content and format further includes the step of beginning the scan by searching for a command.

9. A method as recited in claim 1 wherein the step of determining whether the data is passed to a node on the computer network further includes the step of passing the data to the node if the data has acceptable content and format.

10. A method as recited in claim 1 wherein the step of translating the data before passing it to a node on the computer network is performed as the data is received.

11. A method as recited in claim 1 wherein the step of receiving the data from the external source further includes the step of determining a port address to which the data is being sent.

12. A method as recited in claim 1 wherein the step of scanning the data further includes the step of separating the data into portions wherein a portion of the data includes message-data or a plurality of commands.

13. A method as recited in claim 12 wherein a command is a flag.

14. A method as recited in claim 1 wherein the step of scanning the data further includes the step of pausing the scan when a message-data portion is detected and resuming the scan when a command portion is detected.

15. A method as recited in claim 14 wherein the step of resuming the data scan further includes the step of detecting an end-of-data receipt from a node on the computer network indicating that the message-data portion has been received.

16. A method as recited in claim 1 wherein the rule set is set according to the Simple Mail Transfer Protocol and includes a HELO command, a MAIL command, a RCPT command, a NOOP command, a QUIT command, a DATA command, and a RSET command.

17. A method as recited in claim 16 wherein the rule set further includes a group of special characters.

18. A method as recited in claim 16 wherein the step of translating the data further includes the step of replacing a command not contained within the rule set with the NOOP command.

19. A method as recited in claim 1 wherein the step of scanning the data further includes the step of using a string compare instruction.

20. A data security apparatus for use in a computer network for checking data as the data is received and before the data is transmitted to a node on the computer network, the apparatus comprising:
   a mail detector for determining whether an external source is attempting to establish a mail connection with a computer network wherein the computer network is receptive to one or more recognized protocols;
   a data receiver for receiving data from the external source;
   a protocol evaluator for evaluating the protocol used by the external source in sending the data and for determining whether the data from the external source is formatted based on one or more of the recognized protocols;
   a data scanner for scanning the data for acceptable content and format as determined by a rule set established by one of the recognized protocols wherein the data is scanned in subdivisions set by the recognized protocol as the data is received by the computer network;
   a data translator for translating the data before it is passed to the node on the computer network;
   a device for determining whether the data should be transmitted to the node on the computer network; and
   a network data transmitter for transmitting the data to the node on the computer network soon after the data is scanned.

21. A data security apparatus as recited in claim 20 wherein the recognized protocols acceptable to the protocol evaluator include SMTP, ICMP, FTP, and H.323.

22. A data security apparatus as recited in claim 20 wherein the protocol evaluator further includes a data rejecter that rejects the data and sends a rejection message to a source if the protocol evaluator does not accept the protocol in which the data is being sent.

23. A data security apparatus as recited in claim 20 wherein the data translator includes a data intake component that translates the data as the data is received by the data translator.

24. A data security apparatus as recited in claim 20 wherein the mail detector further includes a port address detector for determining a port address to which the data is being sent.

25. A data security apparatus as recited in claim 20 wherein the data scanner further includes a data separator for separating the data into portions of data such that a portion of data includes at least one of message-data and a command.

26. A data security apparatus as recited in claim 20 wherein the data scanner further includes a scan pauser for pausing the data scanner when a message-data portion is detected and resuming the scan when a command portion is detected.

27. A data security apparatus as recited in claim 20 wherein the data scanner further includes an end-of-data detector for detecting an end-of-data receipt from a node on the computer network indicating that the message-data portion has been received.

28. A data security apparatus for use in a computer network for checking data as the data is received and before the data is transmitted to a node on the computer network, the apparatus comprising:

means for determining whether an external source is attempting to establish a mail connection with a computer network wherein the computer network is receptive to one or more recognized protocols;

means for receiving the data from the external source;

means for determining whether the data from the external source is formatted according to one of the recognized protocols;

means for scanning the data for acceptable content and format as determined by a rule set established by one of the recognized protocols such that the data is scanned in subdivisions set by a recognized protocol as the data is received by the computer network;

means for determining whether the data is passed to a node on the computer network;

means for translating the data before transmitting the data to the node on the computer network; and means for transmitting the data to the node on the computer network such that the data is transmitted soon after the data is scanned.

29. A data security apparatus as recited in claim 28 further comprising means for rejecting the data if the data is not formatted according to a recognized protocol.

30. A data security apparatus as recited in claim 29 further comprising means for sending a rejection message to a source if the protocol is not a recognized protocol.

31. A data security apparatus as recited in claim 28 further comprising means for passing the data to the node if a command contained within the data is acceptable.

32. A data security apparatus as recited in claim 28 further comprising means for beginning the scan by searching for a command.

33. A data security apparatus as recited in claim 28 further comprising means for passing the data to the node if the data has acceptable content and format.

34. A data security apparatus as recited in claim 28 further comprising means for determining a port address to which the data is being sent.

35. A data security apparatus as recited in claim 28 further comprising means for separating the data into portions wherein a portion of the data includes message-data or a plurality of commands.

36. A data security apparatus as recited in claim 28 further comprising means for pausing the scan when a message-data portion is detected and resuming the scan when a command portion is detected.

37. A data security apparatus as recited in claim 28 further comprising means for detecting an end-of-data receipt from a node on the computer network indicating that the message-data portion has been received.

38. A data security apparatus as recited in claim 28 further comprising means for comparing character strings.

39. A computer-readable medium containing programmed instructions arranged to check data as the data is received and before the data is transmitted to a node in a computer network configured to receive data, the computer-readable medium including programmed instructions for:

determining whether an external source is attempting to establish a mail connection with a computer network wherein the computer network is receptive to one or more recognized protocols;

receiving the data from the external source;

determining whether the data from the external source is formatted according to one of the recognized protocols;

scanning the data for acceptable content and format as determined by a rule set established by one of the recognized protocols such that the data is scanned in subdivisions set by a recognized protocol as the data is received by the computer network;

determining whether the data is passed to a node on the computer network;

translating the data before transmitting it to a node on the computer network; and transmitting the data to the node on the computer network soon after the data is scanned.

40. A computer-readable medium as recited in claim 39, wherein the programmed instructions for determining whether the data from the external source is formatted according to one of the recognized protocols further comprises programmed instructions for rejecting the data if the data is not formatted according to one of the recognized protocols.

41. A computer-readable medium as recited in claim 39, wherein the programmed instructions for determining whether the data should be transmitted to a node on the computer network further comprises programmed instructions for passing the data to the node if a command contained within the data is acceptable.

42. A computer-readable medium as recited in claim 39, wherein the programmed instructions for scanning the data for acceptable content and format further comprises programmed instructions for beginning the scan by searching for a command.

43. A method as recited in claim 39 wherein the programmed instructions for determining whether the data is passed to a node on the computer network further comprises programmed instructions for passing the data to the node if the data has acceptable content and format.

44. A method as recited in claim 39 wherein the programmed instructions for translating the data before passing it to a node on the computer network further comprises programmed instructions for performing the translation as the data is received.

45. A method as recited in claim 39 wherein the programmed instructions for scaning the data further comprises programmed instructions for pausing the scan when a message-data portion is detected and resuming the scan when a command portion is detected.

46. A method as recited in claim 45 wherein the programmed instructions for resuming the data scan further comprises programmed instructions for detecting an end-of-data receipt from a node on the computer network indicating that the message-data portion has been received.

* * * * *